June 20, 1939.   A. E. DOUGLASS   2,163,513
PRODUCTION AND COOLING OF CEMENT CLINKER
Original Filed Dec. 1, 1937    4 Sheets-Sheet 3

INVENTOR
ALFRED E. DOUGLASS
BY
ATTORNEYS

June 20, 1939.    A. E. DOUGLASS    2,163,513
PRODUCTION AND COOLING OF CEMENT CLINKER
Original Filed Dec. 1, 1937    4 Sheets-Sheet 4

INVENTOR
ALFRED E. DOUGLASS
BY
ATTORNEY

Patented June 20, 1939

2,163,513

UNITED STATES PATENT OFFICE 2,163,513

PRODUCTION AND COOLING OF CEMENT CLINKER

Alfred E. Douglass, Catasauqua, Pa., assignor to Fuller Company, Catasauqua, Pa., a corporation of Delaware Original application December 1, 1937, Serial No. 177,634. Divided and this application July 8, 1938, Serial No. 218,228

12 Claims. (Cl. 263—53)

This invention relates to the production and cooling of Portland cement clinker and more particularly to a method of abruptly air quenching or chilling clinker produced in a rotary kiln. More specifically, it relates to the rapid chilling of clinker to change a maximum proportion of the liquid phase to an undercooled-liquid or "glass" to limit to as small amounts as possible the proportions of the constituents which crystallize out of solution when the liquid is cooled slowly. It has especially to do with the cooling of cement clinker containing a proportion of magnesium oxide at a rate sufficiently rapid to cause at least a substantial proportion of the liquid phase to solidify without crystallization, as an under-cooled liquid or "glass" in which the magnesia is present in solid solution, and thereby rendered innocuous.

A preferred type of apparatus, which can be operated to carry out the practice of the present invention, is disclosed and claimed in Patent No. 2,137,158 of which the present application is a division.

Delayed expansion or unsoundness of Portland cement concrete, attributable to high magnesia content and resulting in disintegration in concrete structures, has been determined to be directly related to the proportion of free magnesia in the crystalline form, periclase. The rate of hydration of periclase is extremely slow and investigations have indicated that complete hydration and substantial disintegration may be delayed for periods up to about five years. An accelerated test for the determination of unsoundness of Portland cement is now available in a new autoclave technique, and definite references herein to percentage of expansion refer to autoclave test specimens. It has been decided by the cement industry that cements expanding more than 1% are unsound. The phrase "high magnesia content", as used herein, includes cements in which the proportion of magnesium oxide ranges from a minimum of about 3% to the maximum permitted by cement specifications, namely 5%, although cements of slightly greater magnesia content are not necessarily unsound if the magnesia is not permitted to crystallize, as will appear more fully hereinafter.

The liquid phase of the clinker at the burning temperature, usually 2600° to 2700° F., is believed to comprise all of the alumina and iron oxide, the magnesium oxide, a small proportion of the calcium oxide and a slight amount of silica. Little, if any, of the magnesium oxide reacts, in the normal range of cement clinker, with the other compounds present, although possibly a negligible proportion combines with or is held within the iron compound. The quantity of the liquid is therefore related to the proportions of the fluxing compounds, iron and alumina, in the mixture. The theoretical proportion of liquid, in clinkers of usual commercial compositions, accordingly approaches a maximum of about 30%. Crystallization of the liquid is completed when the temperature of the clinker drops to about 2200° F., no apparent increase in crystallization occurring below this temperature. The extent of crystallization is directly related to the rate of temperature drop. If the liquid is cooled slowly or at a moderate rate, the principal compounds that crystallize out of solution are tricalcium aluminate, tetracalcium alumino ferrite, and lastly periclase (free MgO). Of these crystalline compounds, periclase is definitely harmful as it is the principal contributor to delayed unsoundness. If the liquid containing the dissolved magnesium oxide is cooled abruptly, the magnesium oxide is held in the proportion of liquid which solidifies as glass in relatively large concentration, and has no apparent tendency to produce unsoundness. If the clinker contains a substantial proportion of alumina, limiting the formation or crystallization of tricalcium aluminate results in a cement more easily controlled as to setting time. Further, some authorities believe that relatively large proportions of the crystalline compound tetracalcium alumino ferrite reduce the resistance of Portland cement concrete to attack by sulphates and chlorides, and to freezing and thawing.

The immense practical difficulties involved in air quenching or otherwise cooling the clinker make it impractical, if not impossible, to attain the maximum theoretical glass content, in view of the conditions under which the clinker is burned, the high temperatures necessary, the wide range of clinker particle sizes and the narrow range of temperature drop within which crystallization takes place. The production of about 20 to 25% of glass, in high magnesia clinkers of the types described, is highly satisfactory with reference to magnesia unsoundness because the magnesia is the last to crystallize and necessarily tends to concentrate in any substantial proportion of the liquid which solidifies as glass, and, if the cement is otherwise properly prepared, the autoclave expansion will not exceed a small fraction of one percent.

Recent commercial cement clinkers have been found to have a range of glass contents from 2 to 22%, this extreme variation being due to the bustle and to avoid reducing the temperature of the secondary combustion air. This may conveniently be accomplished by providing an adjustable damper in the exhaust flue or stack.

For a better understanding of the invention, and a preferred type of apparatus for the practice of the method, reference is made to the accompanying drawings, in which:

Fig. 1 is a sectional elevation of the apparatus for primary cooling,

Figure 3:
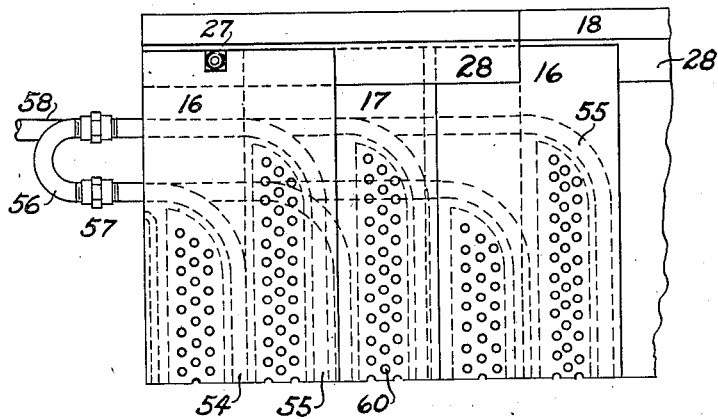
Figure 5:
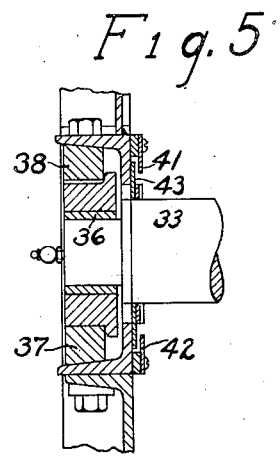
Figure 4:
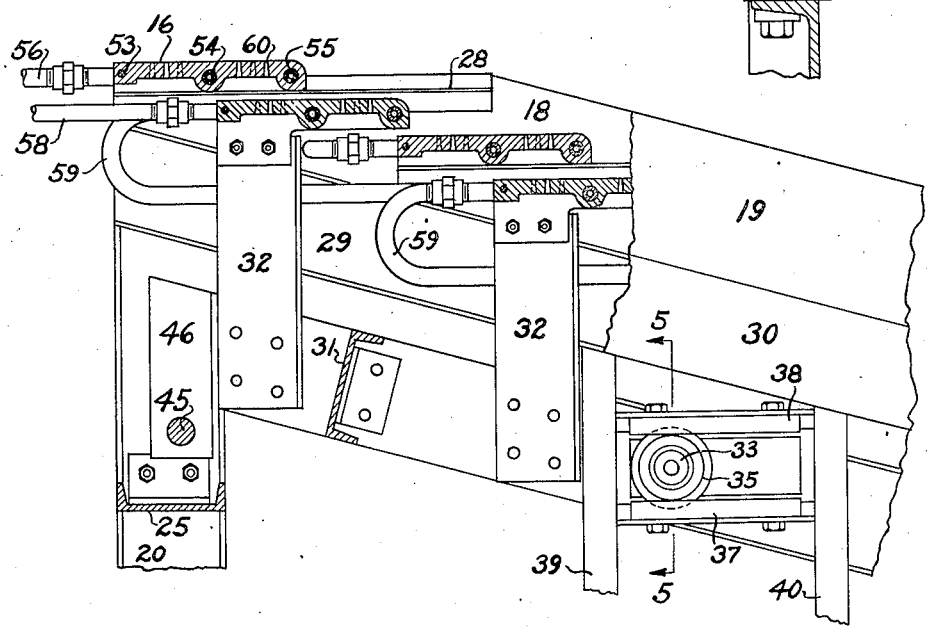
Figure 6:
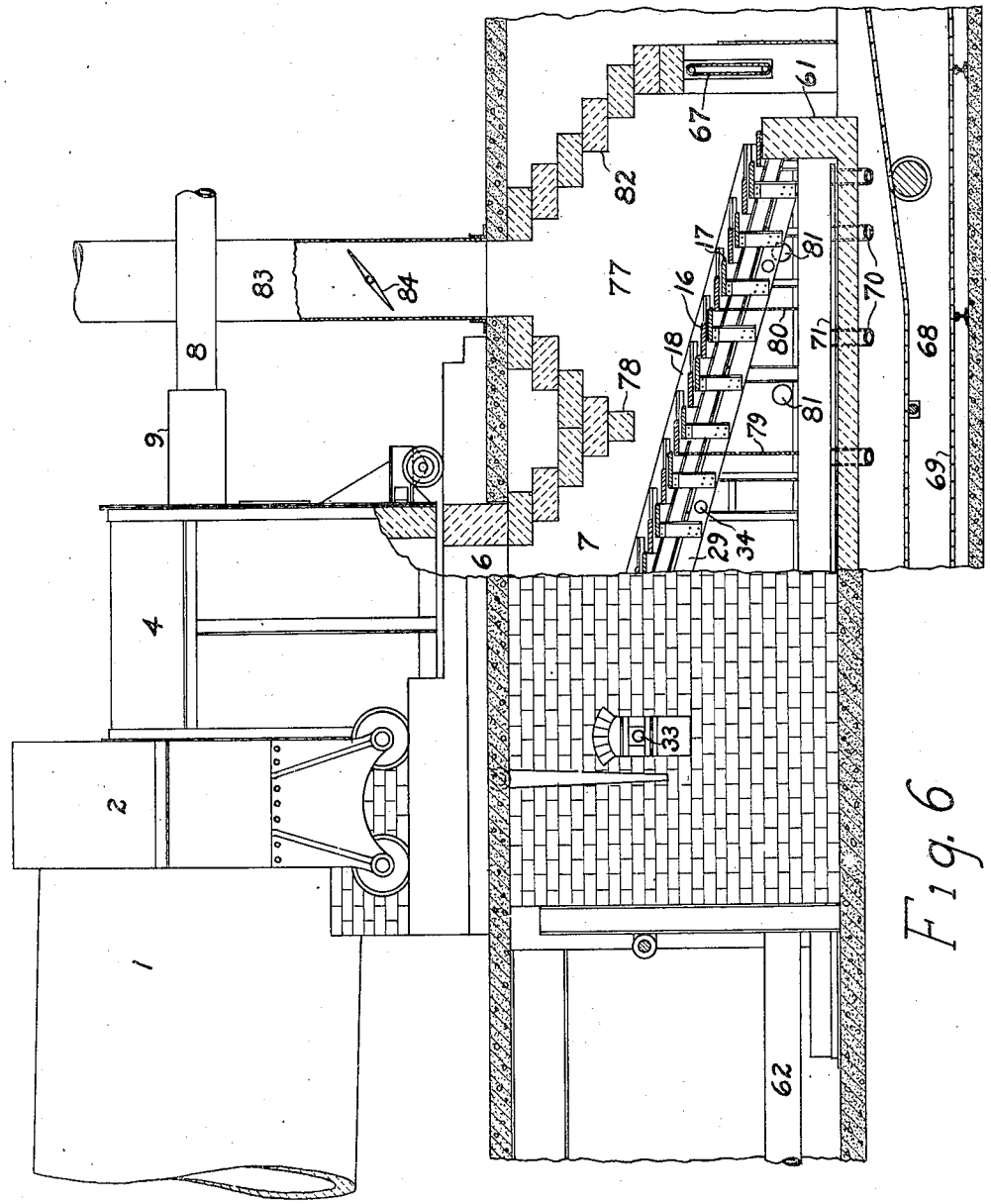

Fig. 3 is a fragmentary plan view of the rearward portion of the grate assembly, Fig. 4 is a fragmentary elevation partly in section, of the rearward portion of the grate assembly, Fig. 5 is a cross-sectional detail of one of the supporting wheels for the moving grate, on line 5—5 of Fig. 4, and Fig. 6 is an elevation, partly in section of a modified form of the apparatus in which a single grate assembly is employed to effect both primary and secondary cooling.

Referring to the drawings, and first to Fig. 1, a rotary kiln 1, of conventional type, is shown to be closed and sealed by a refractory-lined hood 2, the hood being provided with a relatively large circular opening 3 communicating with the upper portion of an arch-shaped, refractory-lined bustle 4, the bustle being longer than usual and having an open bottom 5, which registers with a passage 6 opening into the cooling chamber 7. The kiln is shown to be fired by pulverized coal, as this fuel presents the greatest difficulty in avoiding delayed cooling and is more commonly used than oil or gas. The coal, suspended in the primary air stream, enters the kiln through the fuel pipe 8, the portion of the pipe within the bustle 4 and the opening 3 of the hood being protected by a water-jacket 9 supplied with cooling water through a suitable connection indicated at 10. The fuel stream enters the kiln entirely surrounded by highly pre-heated secondary air and this, together with the retracted position of the ends of the fuel pipe and heat radiation from the refractory surfaces of the hood, causes rapid combustion and advances the burning zone or region of highest temperature toward the discharge end of the kiln, whereby the clinker is discharged before substantial crystallization from the liquid phase takes place. It will also be seen that the location of the circular opening 3 is such that its walls prevent impingement of the relatively cool secondary air stream upon the hot clinker, thereby preventing freezing of the liquid in the kiln itself.

Figure 2:
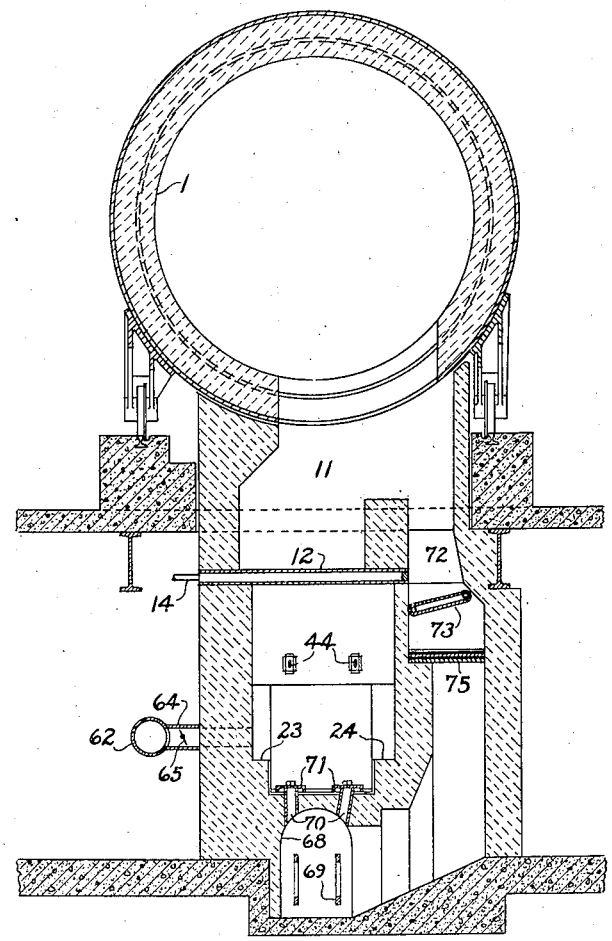
Fig. 2 is a cross-sectional elevation on line 2—2 of Fig. 1.

The partly molten clinker falls through a narrow clinker chute 11, the chute being displaced transversely toward the "rising side" of the kiln, as shown more clearly in Fig. 2, the dimensions and location of the chute preventing a counterflow of air through the descending clinker. The bottom of the chute is closed by a water-cooled shelf 12, provided with suitable baffles 13 for guiding the circulation of water supplied through the connection 14. After the clinker particles have accumulated upon the shelf 12, and have formed a natural angle of repose, the descending clinker particles are distributed by the pile thus formed and pass through the entrance 15 of the cooling chamber 7, in which they form as an inclined bed resting upon the grate assembly about to be described.

Referring to Figs. 1, 3 and 4, it will be seen that all of the fixed grates 16 are rigidly secured to a stationary frame, and all of the moving grates 17 are similarly secured to a moving frame, forming separate, unitary structures. The stationary frame comprises inclined channel members 18 and 19, secured by upright supports, as at 20 and 21, to lower horizontal frame members 22 which rest upon the ledges 23 and 24, shown in Fig. 2, suitable transverse braces being provided as at 25 and 26. The fixed grates 16 are bolted, as at 27 to angular brackets 28, welded or otherwise secured to the frame members 18 and 19, each bracket extending forwardly beyond the fixed grate to deflect the clinker particles from the space between the side edges of the moving grates 17 and the frame members 18 and 19.

The moving frame comprises inclined side members 29 and 30, suitably braced as at 31, the side members carrying uprights 32 to which flanges, cast integrally at the side edges of the moving grates 17, are secured. The members 29 are secured to axles 33 and 34, supported by flanged wheels 35, shown in detail in Fig. 5; provided with bronze bushings 36, the wheels turning on the axles and running on rails 37 and guided by upper rails 38, the rails being bolted to angle members secured to and supported by uprights of the stationary frame, as at 39 and 40. Fixed plates 41 and 42 cooperate with a plate 43 secured to each axle to seal the apparatus against an outward flow of air past the wheels, as will appear more fully hereinafter.

The desired reciprocating motion of the movable frame may be conveniently accomplished by two spaced eccentrics of conventional type comprising eccentric rods 44 pivotally connected to a horizontal shaft 45 secured to brackets 46 on the movable frame members, the rods passing through slots in the rear wall of the chamber 7 and terminating in the usual straps 48 surrounding each eccentric disc 49. A common crank shaft is provided with a sprocket 50 driven through a chain 51 by a variable speed motor, with speed reducer, indicated at 52. It will be seen that the grates 17 move in a horizontal plane between the fixed grates 16 and that the extent of movement or throw depends upon the eccentricity of the discs 49 on the crank-shaft. In Fig. 5, the moving grates are shown to be in their rearmost position and the maximum permissible advance is about one-half their width, at which point the rear edge of each moving grate is covered by the leading edge of the fixed grate above it, thereby avoiding passage of fine clinker between the grates. It will also be understood that the rate of travel of the bed, and consequently its thickness can be varied by changing the speed of the motor 52.

As shown in detail in Figs. 3 and 4, the fixed and moving grates are essentially similar, and may be gray iron castings, the forward or leading edges of the fixed grates and the forward and side edges of the moving grates preferably being chilled in casting to resist the wear of the highly abrasive clinker. The rear edge of each grate is reinforced by a steel rod 53 and water-cooling tubes 54 and 55 are imbedded in the casting and are thoroughly bonded as integral parts thereof. These tubes may be tinned or galvanized iron water pipes and are curved and spaced as indicated in Fig. 3 so that the entire surface of the grate is effectively cooled for the dual purposes of cooling the clinker and making it unnecessary to employ heat resisting alloys. The ends of the tubes of each fixed grate are coupled by U-bends 56 and unions 57, the moving grates being provided with similar bends but on the opposite side. Cooling water is supplied through a suitable flexible connection, such as a flexible hose, not shown, to the pipe 58 and passes through the upper moving grate 17 and then downwardly to the next lower moving grate through the vertical U-bend 59, single circuits of cooling water being thus supplied separately to the fixed and moving grates.

Each of the grates is provided with a multiplicity of vertical ports or orifices 60, the orifices being conical and widening downwardly so that they will not be plugged by small particles of clinker when the apparatus is idle and the air supply is stopped. The alternate grates are spaced a distance, usually about ¼", to form horizontal air passageways from the lower portion of the chamber 7, which forms the wind-box. The forward or discharge end of the cooling chamber 7 is closed below the grate assembly by a refractory wall 61 upon which the lowermost fixed grate rests. The ancillary or secondary combustion air is the principal cooling medium and is supplied to the wind-box portion of the chamber 7 through a duct 62 supplied by the usual fan, not shown, the pressure being sufficient to overcome the resistance to flow presented by the grate and the thickness and density of the clinker bed. The volume of the air so supplied is limited to the combustion requirements of the kiln together with any additional quantity necessary to compensate for leakage. The wind-box is preferably provided with at least one transverse baffle 63 to form a compartment supplied by the duct 62 through one of the connections 64 which is provided with a damper 65 whereby the necessary volume of air can be diverted through and between the grates adjacent to the entrance 15 of the chamber 7, to provide the abrupt chilling previously described. Preferably at least one additional baffle, as indicated at 66, divides the wind-box into additional compartments, whereby the volume flow of air through the remainder of the clinker bed may be proportioned to provide for a maximum of cooling and heat recuperation.

The clinker discharging over the lowermost fixed grate falls between the wall 61 and a pivotally supported water-cooled gate or screen 67, the clinker falling to a tunnel 68 from which it may conveniently be conveyed by a drag-chain 69 of conventional type. The tunnel 68 is provided with spaced passages 70 for the discharge of fine clinker particles and dust which accumulate in the wind-box, particularly when the apparatus is idle, the passages 70 normally being closed by slide-gates 71.

By reference to Fig. 2, it will be seen that a clinker by-pass chute 72 is provided through which the clinker may be diverted in the event of damage or other accidental stoppage of the above described cooling mechanism. This chute is normally closed by a pivoted water-cooled grate 73. To divert the clinker through the chute 72, the gate 74, shown in Fig. 1, is swung to the dotted line position, closing the entrance 15 to the cooling chamber, the gate 73 is swung to a vertical position and the clinker falls to the upper surfaces of at least three spaced and partially overlapping plates 75, the lower plates being echeloned forwardly to form an incline from which the clinker is blown by air under fan pressure entering the chute between the plates. From the plates, the clinker descends by gravity and is removed by the drag-chain 69. This arrangement provides for the essential abrupt chilling of the clinker and avoids interruption of the kiln operation.

The operation of the apparatus will be generally apparent from the foregoing, and it will be understood that a relatively flat, inclined clinker bed forms on the grate surfaces and is moved toward the forward or discharge end of the cooling chamber at a regular, intermittent rate. The thickness of the bed, normally from 3 to 6 inches, and the rate of travel are controlled by the rate of reciprocation, the discs 49 of the eccentrics usually being driven at a speed of from 4 to 6 R. P. M. in an apparatus of the proportions illustrated. The individual clinker particles are subjected to continuous agitation and rolling movements as they descend from grate to grate and are alternatively and successively subjected to air blasts from two directions. As the moving grates are advanced and retracted, the orifices 60 in the rear half of each grate, excepting the first and last, are alternately covered and uncovered. During the rearward movement, the leading edges of the fixed grates force the clinker particles to descend to the next lower fixed grate, from which they are forced during the forward movement, and it will be realized that the locations of the horizontal air blasts change continuously. This treatment of the clinker accordingly provides for abrupt and uniform chilling.

In the practical operation of the above described apparatus, in the cooling of high magnesia clinker, of 4.4% MgO, high theoretical tricalcium aluminate and low iron, the autoclave specimens averaged 0.25%, with expansions down to 0.15% under favorable condition, whereas the same kiln when equipped with an integral cooler of conventional type, produced satisfactory, hard burned clinker of equivalent chemical composition, but autoclave expansions were prohibitive, ranging between 2.0 and 4.0%, with average specimens expanding 2.5%.

The modified form of apparatus illustrated in Fig. 6, is designed to effect both primary and secondary cooling of the clinker, i. e., in addition to each of the purposes above described, to reduce the temperature of the clinker quickly to improve its grinding characteristics. Thus, the permissible volume of air that may efficiently be employed in the primary cooler, illustrated in Fig. 1, is limited to the combustion requirements of the kiln and the clinker discharged therefrom will still range in temperature from about 800° to 1000° F.

In this form, the principal changes have to do with a cooling chamber and grate assembly of considerably increased length, with means to exhaust and control the additional air quantity required for secondary cooling. The same reference characters are applied, where appropriate, and the modified and additional parts are shown in section. The primary cooling chamber 7 is separated from the secondary cooling chamber 77 by a hanging or suspended wall 78, sufficient clearance above the grates being provided to permit large lumps of clinker to pass. Below, and preferably slightly to the rear of the wall 78, the wind-box is divided by an additional baffle 79, forming the principal division wall to separate the secondary combustion air from the waste air employed for secondary cooling. Distribution of the additional air may further be controlled by one or more baffles 80, to provide separate compartments supplied by connections 81 opening into the duct 62, under control of dampers 65, as illustrated in Fig. 2.

The slopes of the hanging wall 78 and the suspended arch 82 permit the additional air, after effecting the desired secondary cooling, to ascend freely to an exhaust flue or stack 83, through which the flow is controlled by an adjustable damper 84, the damper serving as a convenient means to establish a balanced pressure condition between the primary cooling chamber 7 and the secondary cooling chamber 77, to prevent air flow from one chamber to another. Variation in the kiln flue gas analysis and temperature variations in the ascending air streams are sufficiently accurate indices of unbalanced pressure conditions for practical purposes.

I claim:

1. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as a bed of substantially uniform thickness inclining downwardly in the direction of its movement, advancing the bed and continuously agitating the particles thereof, forcing air to penetrate and flow through the bed, and recovering and utilizing at least a part of said air as said stream of preheated secondary air.

2. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, advancing the bed and continuously agitating the particles thereof, continuously subjecting the bed to blasts of air directed horizontally into the bed generally in the direction of its movement, the air flowing upwardly through it, and recovering and utilizing at least a part of said air as said stream of preheated secondary air.

3. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, advancing the bed and continuously agitating the particles thereof, continuously subjecting the bed to a series of blasts of air, successive blasts being directed horizontally into the bed approximately throughout the width thereof and generally in the direction of its movement, the air flowing upwardly through it, and recovering and utilizing at least a part of said air as said stream of preheated secondary air.

4. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, advancing the bed and continuously agitating the particles thereof, subjecting the bed to a multiplicity of air blasts directed vertically through the bed, and recovering and utilizing at least a part of said air as said stream of secondary combustion air.

5. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, advancing the bed and continuously agitating the particles thereof, subjecting the bed to a multiplicity of air blasts directed vertically through the bed at a plurality of successive levels, continuously changing the horizontal location of the said blasts at alternate levels to increase the distribution of the air through the clinker particles, and recovering and utilizing at least a part of said air as said stream of secondary combustion air.

6. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, intermittently and regularly advancing the bed under conditions of continuous agitation, subjecting the bed to blasts of air flowing upwardly through it, and recovering and utilizing at least a part of said air as said stream of secondary combustion air.

7. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, intermittently and regularly advancing the bed under conditions of continuous agitation, continuously subjecting the bed to a series of blasts of air, successive blasts being directed horizontally into the bed approximately throughout its width and generally in the direction of its movement, subjecting the bed to a multiplicity of additional air blasts directed vertically through the bed, and recovering and utilizing at least a part of said air as at least the major portion of said stream of secondary combustion air.

8. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, intermittently and regularly advancing the bed under conditions of continuous agitation, continuously subjecting the bed to blasts of air at successive levels directed horizontally into the bed approximately throughout its width and generally in the direction of its movement, continuously changing the horizontal location of the blasts at alternate levels, and recovering and utilizing at least a part of the air as at least a part of said stream of secondary combustion air.

9. The method of abruptly chilling Portland cement clinker produced in a rotary kiln which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker from the kiln out of contact with a substantial proportion of said stream of preheated secondary combustion air and forming the clinker as an approximately flat bed of substantially uniform thickness inclining downwardly in the direction of its movement, intermittently and regularly advancing the bed under conditions of continuous agitation, continuously subjecting the bed to blasts of air from two directions, including a series of blasts at successive levels directed horizontally into the bed approximately throughout its width and generally in the direction of its movement, continuously changing the horizontal location of the blasts at alternate levels, and a multiplicity of blasts directed vertically through the bed at a plurality of successive levels, continuously changing the horizontal location of said blasts at alternate levels and alternatively with the first mentioned levels, and recovering and utilizing the air as at least the major portion of said stream of secondary combustion air.

10. The method of cooling Portland cement clinker and abruptly chilling the liquid phase thereof which comprises continuously forming a bed of clinker particles, the particles added to the bed containing quantities of molten compounds, the bed inclining downwardly in the direction of its movement, with the partly molten particles entering the upper portion of the bed, advancing the bed intermittently and regularly under conditions of continuous agitation, and subjecting the bed to a multiplicity of blasts of cooling air, the volume of the air passing through the bed being proportioned, a sufficient quantity of the air being forced through the upper portion of the bed to solidify the liquid at a rapid rate.

11. The method of cooling Portland cement clinker containing a proportion of magnesia and produced in a rotary kiln, to prevent crystallization of a substantial proportion of the magnesia which comprises discharging the clinker from the kiln in a partly molten state, continuously forming a bed of clinker particles while containing quantities of molten compounds, the bed inclining downwardly in the direction of its movement, with the partly molten particles entering the upper portion of the bed, advancing the bed intermittently and regularly under conditions of continuous agitation, and subjecting th epartly molten clinker particles immediately upon entering the bed to a flow of cooling air in sufficient volume to solidify a substantial proportion of the liquid as a glass to hold said substantial proportion of magnesia in solid solution.

12. The method of primary cooling of Portland cement clinker containing a proportion of magnesia and produced in a rotary kiln, to prevent crystallization of a substantial proportion of the magesia, which comprises injecting a fuel stream surrounded by a stream of preheated secondary combustion air into the kiln and directing the streams to prevent them from impinging upon the clinker, causing combustion to take place in the vicinity of the discharge end of the kiln, so that the clinker will be discharged in a partly molten state, discharging the clinker continuously and forming a bed thereof while containing quantities of molten compounds, the bed inclining downwardly in the direction of its movement, advancing the bed intermittently and regularly under conditions of continuous agitation, subjecting the partly molten clinker particles immediately upon entering the bed to blasts of cooling air in sufficient volume to solidify a substantial proportion of the liquid as glass to hold said substantial proportion of magnesia in solid solution, forcing additional air through the remainder of the bed, the total volume of air forced through the bed being sufficient to satisfy the requirement of the kiln for secondary combustion air, and recovering and utilizing the air as said stream of secondary combustion air.

ALFRED E. DOUGLASS.

June 20, 1939.　　　P. H. FARREN　　　2,163,514
TORQUE CONTROLLED CLUTCH
Filed Aug. 17, 1938　　　2 Sheets-Sheet 1
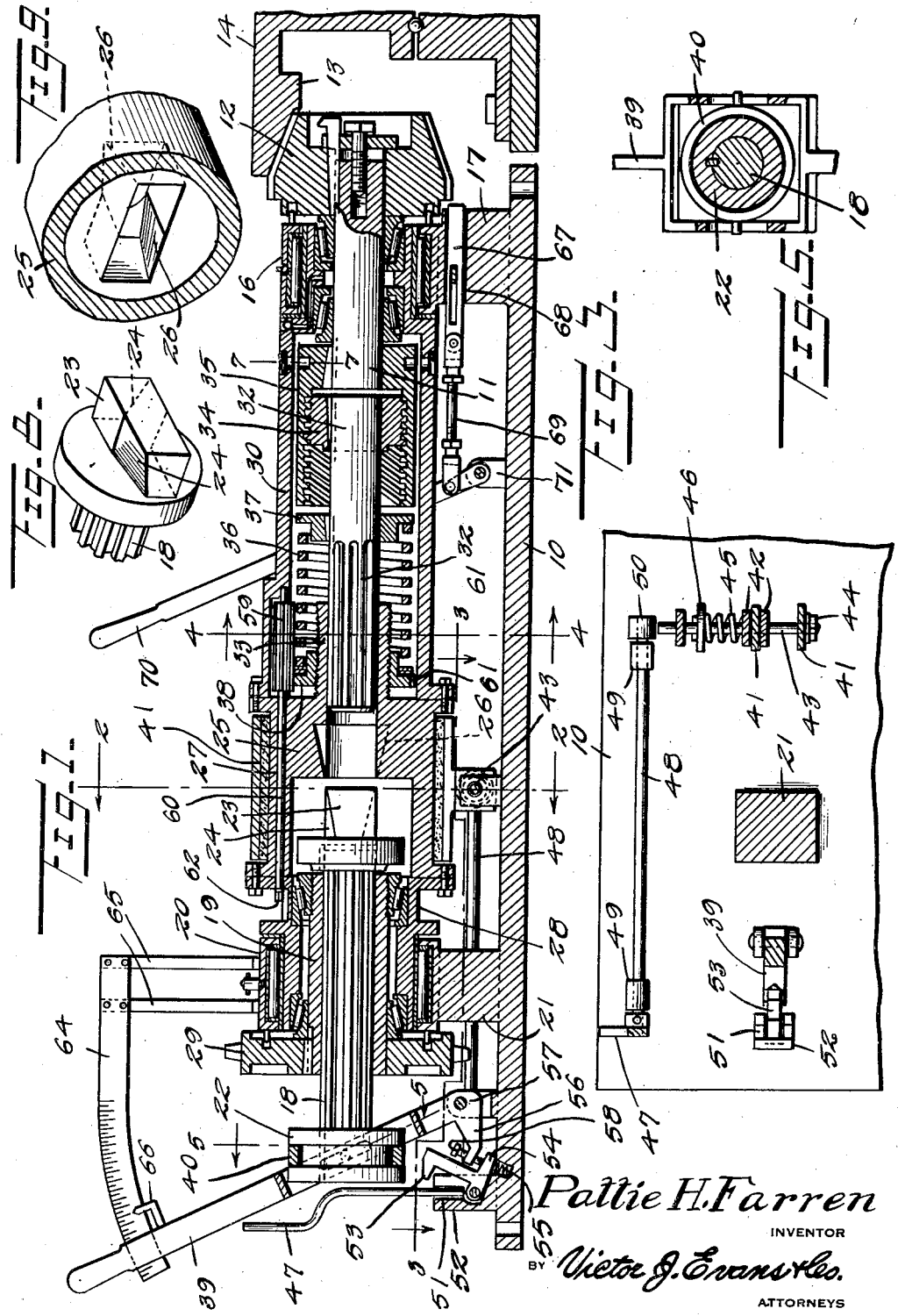
Pattie H. Farren
INVENTOR
BY Victor J. Evans & Co.
ATTORNEYS